United States Patent [19]

Saika et al.

[11] Patent Number: 5,232,574

[45] Date of Patent: Aug. 3, 1993

[54] POLYVIOLOGEN MODIFIED ELECTRODE AND USE THEREOF

[75] Inventors: Tetsuyuki Saika, Osaka; Takeo Shimidzu, Uji, both of Japan

[73] Assignee: Daiso Co. Ltd., Osaka, Japan

[21] Appl. No.: 748,077

[22] Filed: Aug. 21, 1991

[30] Foreign Application Priority Data

Aug. 21, 1990 [JP] Japan .................. 2-220795

[51] Int. Cl.$^5$ .............................. G01H 27/26
[52] U.S. Cl. ........................ 204/418; 204/416; 204/290 R; 204/59 R; 204/72
[58] Field of Search ............... 204/403, 415, 290 R, 204/416, 418, 435, 59 R, 72

[56] References Cited

U.S. PATENT DOCUMENTS

| | | | |
|---|---|---|---|
| 3,856,714 | 12/1974 | Moore et al. | 260/2 R |
| 4,439,302 | 3/1984 | Wrighton et al. | 204/290 R |
| 4,545,382 | 10/1985 | Higgins et al. | 204/415 |
| 4,895,705 | 1/1990 | Wrighton et al. | 204/290 F |
| 4,945,045 | 7/1990 | Forrest et al. | 204/403 |
| 4,978,610 | 12/1990 | Forrest et al. | 204/403 |

Primary Examiner—John Niebling
Assistant Examiner—Bruce F. Bell
Attorney, Agent, or Firm—Wegner, Cantor, Mueller & Player

[57] ABSTRACT

A polyviologen modified electrode which comprises an insoluble film of polyviologen polymerized on a base electrode by electrochemical reduction and electrodeposition of monomer represented by the formula (I)

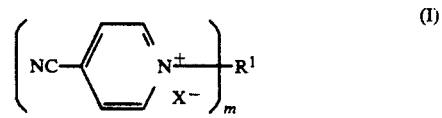

Wherein $R^1$ is a divalent group selected from the groups consisting of alkylene, cycloalkylene, arylene and arylalkylene or a trivalent group selected from the groups consisting of alkanetriyl, cycloalkanetriyl, arylalkanetriyl and aryltriyl; $X^-$ is a counter anion; m is 2 or 3, which electrode has no performance problem in connection with the solubility to water and organic solvent and the annealing phenomenon.

8 Claims, 2 Drawing Sheets

POLYVIOLOGEN MODIFIED ELECTRODE AND USE THEREOF

The present invention relates to a polyviologen modified electrode provided with a polyviologen film insoluble to any solvent which is deposited on the surface of an electrode by means of electrochemical polymerization, and an electrochemical cell containing said electrode.

PRIOR ART

Viologen is a generic term to define 4,4'-dipyridinium salts represented by the formula (A):

wherein R is an organic group and $X^-$ is a counter anion, and known to proceed in the following sequential redox reactions:

The first redox reaction between the dication and the monocation radical proceeds in a reversible way and a cation radical provides strong coloring or color development. The reaction can easily be achieved by an electrochemical or a photochemical reduction, so that it can be utilized in a wide variety of industrial applications. Typical examples are electochromic displays, wet solar batteries, secondary batteries, silver or non-silver salt photography, redox indicators, photochromic materials, etc.

Also, biochemical investigations have been made of this reaction in connection with the bioredox system within the living body, as well as possible applications as herbicides in agriculture.

In the commercial application of viologens as mentioned above, high molecular weight or polymerized viologens are often important in practice, and the production of polymerized viologens has been studied. For instance, JP-A-57-10122 discloses a viologen branched with another high molecular weight backbone chain. Furthermore, polymers are known, in which the backbone chain constitutes a viologen such as polyxylidylviologens and polyarylviologens (JP-A-59-217789), etc.

On the other hand, when a viologen is used as the main substrate in an electrochemical cell such as an electrochromic display, a wet solar battery or an secondary battery, the use of a viologen modified electrode, i.e. an electrode the surface of which is coated with a viologen, has been suggested. As a method of preparing such a viologen modified electrode, there has been carried out a dip method as well as a casting method for coating an electrode with a polyviologen solution because the conventional polyviologen is soluble to water and any polar solvent. However, when the resultant electrode is used as an electrode of an electrochemical cell, the modified polyviologen is soluble into a cell electrolyte and detached from the electrode, thereby stable performance is not obtained. To solve this disadvantage, there has been reported a method in which a polyion complex of polyxylidylviologen as polycation and polystyrene and polystyrene sulfonate as polyanion is spin-coated on an electrode to modify the electrode surface by an insoluble film (see J. Phys. Chim., 85, 818(1981) by AKAHOSHI et al.).

In this method, in which a resultant polyion complex film is insoluble in water or other organicsolvent, it is advantageous to avoid an irreversible coloring (annealing phenomenon) caused by a repeating of redox, but it is disadvantageous to use a solvent of concentrated hydrochloric acid-dimethylformamide on a spin-coating of polyviologen, so much so that it is impossible to use an electrode corroded by the above solvent.

SUMMARY OF THE INVENTION

The first object of the present invention is to provide a polyviologen modified electrode which has no performance problem in connection with the solubility to water and organic solvent as in connection with the annealing phenomenon.

The second object of the present invention is to provide a method for preparing the polyviologen modified electrode with ease by a single step in contrast to the conventional method which comprises two steps; first is a step of preparing a soluble polyviologen and second is a step of forming the same on a surface of the electrode.

The third object of the present invention is to provide an electrochemical cell which comprises at least one polyviologen modified electrode.

According to the first aspect, there is provided a polyviologen modified electrode which comprises an insoluble film of polyviologen polymerized on an electrode by electrochemical reduction and deposition of a monomer represented by the formula (I):

wherein $R^1$ is a divalent group selected from the groups consisting of alkylene, cycloalkylene, arylene and arylalkylene or a trivalent group selected from the groups consisting of alkanetriyl, cycloalkanetriyl, arylalkanetriyl and aryltriyl; $X^-$ is a counter anion; m is 2 or 3.

Further, according to the second aspect, there is provided a method for preparing a polyviologen modified electrode, in which cathodic potential is applied to an electrode to reduce electrochemically the monomer represented by the formula (I) in a liquid electrolyte at a controlled pH of 7 to 10, thereby the monomer is polymerized and deposited on the electrode to form a film of polyviologen attached to a surface of the electrode.

Furthermore, according to the third aspect, there is provided an electrochemical cell as a utilization of the polyviologen modified electrode.

BRIEF DESCRIPTION OF THE DRAWINGS

In FIG. 2, numeral 1 denotes a transparent substrate, 2 denotes a display electrode consisting of a transparent electroconductive film on which a figure or a letter is patterned, 3,3' and 3" denote polyviologen membranes tightly formed on the surface of the display electrodes 2,2',2" by a electropolymerization. 4 denotes a transparent counter substrate and 5 denotes a transparent counter electrode. 6 and 6' denote side walls of the cell.

DETAILED DESCRIPTION OF THE INVENTION

In connection with the polyviologen modified electrode, Kosower and Cotter firstly reported that as a coupling reaction of 4-cyanopyridinium salt, N-methyl-4-cyano-pyridinium (m=1 in the above formula (1)) is chemically reduced to a dimethyl viologen (see J. Am. Chem. Soc., 86, 5524 (1964)).

Thereafter, Carelli et al. found that the coupling reaction of the above N-methyl-4-cyanopyridinium could be also electrochemically made (see J. Electroanal. Chem., 124, 147 (1981)). Further, U.S. Pat. No. 3,694,384 discloses that a monomer of xylenebis(4-cyanopyridinium) salt is chemically reduced by sodium dithionate to obtain a polyxylidyl viologen. The resultant polymer is insoluble to water, which may be caused by its cross link structure. Therefore, it is insoluble to any other solvent and can not be melted, so that the polymer can not be coated by means of the above dip-coating or spin-coating method and thus the electrode can not be so modified by this polymer.

According to the present invention, as different from the conventional art, a monomer having two or three 4-cyanopyridinium groups can be prepared to a viologen unit and also directly polymerized and deposited on an electrode by electrochemical reduction to form an insoluble polymer fixed and modified electrode.

The monomer represented by the general formula (I) used in the present invention is synthesized by subjecting a corresponding dihalide or trihalide with surplus amount of 4-cyanopyridine to Menshutkin reaction. In the case of a monomer in which 4-cyanopyridinium group is bonded to aromatic group, firstly 4-cyanopyridine and 2,4-dinitro phenylchloride are subjected to Menshutkin reaction to give N-(2',4'-dinitrophenyl)-4-cyanopyridinium chloride and then the resultant compound is subjected to substituted reaction to give a desired 4-cyanopyridinium compound.

The Menshutkin reaction is carried out in such a polar solvent as dimethylformamide, acetonitrile and tetrahydrofuran or in non-solvent with heating.

$R^1$ in the formula (I) is a divalent group such as alkylene, cycloalkylene, arylene and arylalkylene, which have C1 to C14; a trivalent group such as alkanetriyl, cycloalkanetriyl, arylalkanetriyl and aryltriyl, which have C3 to C9. Examples of $R^1$ include —(CH$_2$)n (n=1-14), cyclohexylene, 1,4-cyclohexyldimethylene, p-xylene, m-xylene, o-xylene, p-phenylene, m-phenylene, diphenylene, 4,4'-methylenebiphenylene, naphthylene as divalent group; propanetriyl, heptanetriyl, 1,3,5-cyclohexanetrimethylene, mesitylenetriyl and phenyltriyl as trivalent group.

Examples of $X^-$ of the formula (I) include anions of halogen, perchloric acid, tetrafluoroboric acid, phosphoric acid, toluenesulfonic acid, nitric acid, sulfuric acid and so on, but $X^-$ is not limited to these anions.

Herein below is an explanation of the method for preparing the polyviologen modified electrode. For convenience, there is disclosed an example of monomer having m=2 of the formula (I). Monomer having m=3 is also available as the above m=2.

Monomer is dissolved into water to give the concentration of 1 to 1000 m mol/l and the mixture is added with a supporting electrolyte to adjust pH 7-10. In the electrolyte, an electrode to be modified is electrochemically reduced by cathodic potential, thereby the following polymerization reaction electrodeposition proceeds to give a desired polyviologen modified electrode provided with an uniform film of polyviologen at its surface, which film is insoluble to water and any organic solvent and can not be melted by heat. Desired thickness of the film may be selected according to usage and purposes of the modified electrode. Generally, a thickness of 0.01 to 100 μm is suitable to use. The thickness can be controlled by electric quantity.

In the reaction formula, n is degree of polymerization; $X_a^-$ is defined as $X^-$ of the formula (I) or a counter anion from a supporting electrolyte.

During electroreduction, the resultant viologen polymer is colored blue to purple peculiar to a viologen cation radical. Reduction potential, different depending on the monomer to be polymerized, is usually in a scope of −0.6 to −0.8 V (vs.SCE). After electroreduction, when the potential of the electrode comes to 0 V (vs.SCE), the viologen coloring disappears and noncolor or light yellow of the modified film appears.

As examples of the supporting electrolyte, there may be used an electrolyte such as a salt corresponding to $X^-$ of the formula (I), which is usually used in a water-electrochemical system, especially, it is preferable to use an electrolyte, such as sodium perchlorate, sodium tetrafluoro borate and so on in which the synthesized viologen polymer has a low solubility. Further, it is more preferable to use a polyanion electrolyte. The reason is that, if the above low molecular weight electrolyte is used, a polyviologen film modified on the electrode is insolvably fixed by a voluntary crosslinking. An oligomer in which polymerization does not proceed is not deposited on the surface of the electrode and is dispersed into the liquid electrolyte, so that a deposited volume on the electrode becomes small. In comparison to this, if the high molecular weight polyanion electrolyte is used, an oligomer and/or a polyviologen synthesized on the electrode immediately forms a polyion complex as shown in the following figure and a modified film of a polyion complex is deposited. Thereby modification efficiency of polyviologen can be improved and thus a highly modified electrode is obtained. In the reaction, a resultant polyion complex is in a form of crosslinked structure by ion-bonding, thereby current efficiency on polymerizing being improved to increase a modified volume and also on the electrode there being formed a strong and uniform film which is very superior in physical strength.

Complex figure of polyviologen-polystylene sulfonic acid

The preferred examples of the polyelectrolyte include a polymer sulfonic salt with alkaline metal such as polystyrene sulfonic salt, polyvinylsulfonic salt, perfluoroalkyl polysulfonic salt and so on, and a polymer calboxylic salt with alkaline metal such as polyacrylic salt, polymetacrylic salt and so on. It is desired that the low and high molecular molar quantity electrolytes are used by 1 to 10 times equivalent weight of monomer of the formula (I).

In the electrochemical reduction and polymerization, a weak basic condition at pH 7 to 10 is satisfactory to polymerization. Under an acidic condition less than 7 pH a cyano group is predominantly reduced to amino methyl group. On the other hand, under an alkali condition more than 10 pH, a pyridinium monomer is decomposed and thus the solution is colored black. The control of pH is effectively made by using a pH buffer of inorganic salt such as phosphate buffer or an organic alkali such as pyridine, and so on. Preferred examples of a base electrode to be modified by polyviologen include a metal electrode made of platinum, gold, aluminum, copper and so on, a transparent glass electrode made of Indium-Tin-Oxide coating glass (hereinafter referred to as ITO) and SnO$_2$ coating glass (nesa glass), and a plastic electrode coated them.

Apparently different from the main chain type of polyviologen soluble to water, disclosed in JP-A No. 59-217789, the polyviologen polymerized by electrochemical reduction according to the present invention is insoluble to water and organic solvents such as dimethylformamide, tetrahydrofuran, acetonitrile, aceton, chloroform, methanol, ethanol and so on.

In infrared absorption spectrum, an absorption band assigned to the cyano group is not observed. That shows that any cyano group does not remain in the polymer. Further, main structure of the sythesized viologen polymer is presumed as the following main chain type polyviologen.

Structure of main chain part:

wherein Xa$^-$ is counter anion.

Furthermore, the presence of a crosslinked structure can be presumed by insolubility of the polyviologen according to the present invention. That is, it is presumed that, a resultant viologen unit is reduced to a cation radical, which is reacted with an unreacted 4-cyanopyridinium radical to partly form the crosslinked structure as shown in the following formula.

-continued

In the general formula (I), a preparation of polyviologen modified electrode in the case of m=3 can be carried out in a substantially same manner as that of m=2.

In a more practical process, it is recommended that a mixture of monomer (m=3) with monomer (m=2) is used. Concretely, a mixture of monomer (m=2) with monomer (m=3) of 1 to 20 wt. % based on the mixture weight make a stronger crosslinked structure in comparison to that made of only monomer (m=2), thereby efficiency of polymerizing can be improved and also a resultant modified film comes to have a increased mechanical strength.

In the polyviologen modified electrode according to the present invention, its modified film is insoluble to any organic solvent such as dimethylformamide, propylene carbonate, acetonitrile, be izonitryl and so on which is often used as electrolyte. Further, the film is formed by electrochemical methods, so that passages for ion of supporting electrolyte to freely move in and out for required to electrochemical reacting are automatically fabricated in the film, thereby the modified electrode is very useful for usage of electrochemical cells. Especially, it is found that the present modified electrode has a superior performance as an working electrode of an electrochromic display. Further, a electrochemical cell constituted of the modified electrode according to the present invention can be used for a secondary battery and a wet solar cell.

In many cases, the electrochemical cell is constituted of an operating electrode, a counter electrode, a reference electrode and an electrolyte (or liquid), but in some cases, the reference electrode may be not provided. In each of the above constituents, a variety of devices are chosen according to usage of the cell. The modified electrode according to the present invention is applicable to any electrode of the cell. In the case of an electrochromic display device, wherein for example an operating electrode is made of polyviologen, a base plate for supporting the operating electrode and a counter electrode is made of a transparent one, coloring variation can be observed by applying potential between the two electrodes. Any liquid electrolyte using such as a water and a acetonitrile, benzonitrile, dimethylformamide, propylene carbonate is available to the present invention, because the polyviologen film is insoluble to such a electrolyte. Solid electrolyte may be used in the present invention.

Finally, the modified electrode according to the present invention is superior in a reversibility of redox cycle and shows a stable oxidation-reduction potential, so that it is useful for a redox sensor and a reference electrode.

Therefore, according to the polyviologen modified electrode of the present invention, as the polyviologen film modified on the surface can be formed easily and effectively by means of electrochemical method, the modification amount of the insoluble film can be controlled with ease by quantity in the electrochemical reduction and thus a desired electrode with a controlled modification amount according to the purposes can be provided.

Using a monomer having three functional groups and also a polyelectrolyte, a film having a stronger cross-linked structure can be formed on an electrode. Therefore, an electrochromic cell provided with the modified electrode according to the present invention give a good display performance without annealing and is superior in a resistance to repeat use.

EXAMPLE

Production of Monomer (I)

Preparation Example 1

A mixture of 4-cyanopyridine (1 g; 9.6 mmol) and dibromo-p-xylene (1 g; 3.8 mmol) in dimethylformamide (5 ml) was stirred at 60° C. for 24 hours, and yellow precipitat was collected by filtration and washed with acetone to give p-xylidylbis(4-cyanopyridinium)dibromide (1.7 g).

$^1$H-NMR (D$_2$O) δ ppm: 6.01 (4H, s), 7.64 (4H, s), 8.53 (4H, d), 9.24 (4H, d).

Preparation Example 2

A mixture of 4-cyanopyridine (1 g; 9.6 mmol) and dibromo-m-xylene (1 g; 3.8 mmol) in dimethylformamide (5 ml) was stirred at 60° C. for 24 hours, and yellow precipitate was collected by filtration and washed with acetone to give m-xylidylbis(4-cyanopyridinium)dibromide (1.7 g).

$^1$H-NMR (D$_2$O) δ ppm: 6.05 (4H, s), 7.69 (3H, s), 7.75 (H, d), 8.56 (4H, d).

Preparation Example 3

A mixture of 4-cyanopyridine (1 g; 9.6 mmol) and dibromo-o-oxylene (1 g; 3.8 mmol) in dimethylformamide (5 ml) was stirred at 60° C. for 24 hours, and yellow precipitate was collected by filtration and washed with acetone to give o-xylidylbis(4-cyanopyridinium)dibromide (1.7 g).

$^1$H-NMR (D$_2$O) δ ppm: 6.20 (4H, s), 7.50 (4H, s), 8.59 (2H, d), 9.19 (4H, d).

Preparation Example 4

A mixture of 4-cyanopyridine (12.5 g; 0.12 mol) and 1,4-dibromobutane (13 g; 0.06 mol) in dimethylformamide (50 ml) was stirred at 60° C. for 24 hours, and yellow precipitate was collected by filtration and washed with acetine to give tetramethylenebis(4-cyanopyridinium)-dibromide (28.8 g). m.p., 296°-300° C.

$^1$H-NMR (D$_2$O) δppm: 2.22 (4H, m), 4.84 (4H, m), 8.52 (4H, d), 9.21 (4H, d).

Elemental analysis (%): Calcd.: C, 45.3; H, 3.8; N, 13.2; Br, 37.7. Found: C, 45.2; H, 3.6; N, 13.2; Br, 37.5.

Preparation Example 5

A mixture of 4-cyanopyridine (2.1 g; 0.02 mol) and 1,10-dibromodecane (3 g; 0.005 mol) in dimethylformamide (10 ml) was stirred at 60° C. for 4 days, and pale yellow precipitate was collected by filtration and washed with acetone to give 1,10-decanebis(4-cyanopyridinium)dibromide (4.7 g).

$^1$H-NMR (D$_2$O) δppm: 1.40 (12H, br. s), 2.15 (4H, m), 4.82 (4H, t), 8.59 (4H, d), 9.26 (4H, d).

Elemental analysis (%): Calcd.: C, 52.0; H, 5.6; N, 10.8; Br, 31.4. Found: C, 52.3; H, 5.6; N, 10.7; Br, 31.4.

2Br⁻

Preparation Example 6

A mixture of 4-cyanopyridine (2.1 g; 0.02 mol) and 1,7-dibromoheptane (2.6 g; 0.005 mol) in dimethylformamide (10 ml) was stirred at 60° C. for 4 days, and pale yellow precipitate was collected by filtration and washed with acetone to give 1,7-heptanebis(4-cyanopyridinium)dibromide (4.2 g). m.p., 222°–224° C.

$^1$H-NMR (D$_2$O) δppm: 1.40 (6H, br. s), 2.13 (4H, m), 4.73 (4H, t), 8.49 (4H, d), 9.16 (4H, d).

Elemental analysis (%): Calcd.: C, 49.0; H, 4.8; N, 12.0; Br, 34.3. Found: C, 48.9; H, 4.7; N, 11.8; Br, 34.3.

2Br⁻

Preparation Example 7

A mixture of 4-cyanopyridine (1 g; 9.6 mmol) and α,α',α"-tribromomesitylene (1 g; 2.8 mmol) in dimethylformamide (5 ml) was stirred at 60° C. for 12 hours, and yellow precipitate was collected by filtration and washed with acetone to give mesitylenyltris(4-cyanopyridinium)tribromide (1.5 g).

$^1$H-NMR (D$_2$O) δppm: 6.10 (6H, s), 7.70 (3H, s), 8.56 (6H, d), 9.21 (6H, d).

3Br⁻

EXAMPLE 1

Tetramethylenebis(4-cyanopyridinium)dibromide (75.2 mg) as obtained in Preparation Example 4 and sodium chloride (118 mg) as a supporting electrolyte were dissolved in water (20 ml) to make an electrolyte solution of pH 7. An electrochemical cell was set up with an ITO ((indium tin oxide) glass electrode (electrode area, 2 cm$^2$) as a working electrode, a platinum (Pt) wire as a counter electrode and a saturated calometal electrode (SCE) as a reference electrode. Then the monomer was electrolyzed potentiostatically at −0.9 V (SCE) with 0.3 c/cm$^2$ to perform electrochemical polymerization. During polymerization, the color at the working electrode surface could be seen as purple due to formation of polyviologen film thereon. When the electrode potential changed to 0 V, the color disappeared, and the work electrode was confirmed to be modified with a pale yellowish polyviologen film of a thickness of 0.01 μm.

The electrochemical property and spectrosopic property were measured with the polyviologen modified working electrode thus obtained using a Pt wire as a counter electrode placed in an water electrolyte containing 0.1 mol/l of potassium chloride as a support electrolyte to make a cell. The polyviologen modified electrode shows two redox potentials at −0.59 V and −0.9 V indentified with viologen. When polarized to −0.8 V, cathodic potential at −0.8 V was applied the electrode assumed a purple color and showed an optical density (O.D.) of 0.045 at λ$_{max}$ 545 nm.

EXAMPLES 2 to 4

In the same manner as in Example 1 but using sodium sulfate (284 mg) (Example 2), sodium tetrafluoroborate (219 mg) (Example 3) and sodium perchlorate (145 mg) (Example 4) as the support electrolyte, viologen modified electrodes as shown in Table 1 were prepared.

Each of polyviologen modified electrode thus obtained and a Pt wire as a counter electrode were placed in an electrolyte containing 0.1 mol/l potassium chloride as a support electrolyte to make a cell, of which an electrochemical property was observed. The results are also shown in Table 1. The optical density as well as the maximum absorption are also shown therein.

TABLE 1

| Example No. | Film thickness (μm) | Redox potential $E_{\frac{1}{2}}/V$ | Redox potential $E_{\frac{1}{2}}/V$ | Maximum absorption (λ$_{max}$/nm) | Optical density (O.D.) |
|---|---|---|---|---|---|
| 2 | 0.03 | −0.59 | −0.90 | 550 | 0.06 |
| 3 | 0.02 | −0.59 | −0.90 | 550 | 0.05 |
| 4 | 0.02 | −0.59 | −0.90 | 545 | 0.06 |

EXAMPLE 5

Tetramethylenebis(4-cyanopyridinium)dibromide (128 mg; 20 mol/l) as obtained in Preparation Example 4 and potassium polyvinylsulfonate (324 mg; 0.1 mol/l as sulfonic anion) (Nakarai Tesk K.K.) as a supporting electrolyte were dissolved in water (20 ml) to make an electrolytic solution at pH 8.2. The monomer was electrolyed potentiostatically at −0.8 V with 0.1 c/cm$^2$ on ITO glass electrode as a work electrode, by using a Pt wire as a counter electrode and a SCE as a reference electrode at to perform electrochemical polymerization. During polymerization, the color at the work electrode surface could be seen as purple due to formation of polyviologen film thereon. When the potential changed at 0 V, the color disappeared, and the work electrode was confirmed to be modified with an extremely uniform pale yellowish polyviologen film of a thickness of 0.6 μm. This film was excellent in mechanical strength and hardly peeled off even by rubbing with a cloth.

Figure 1:
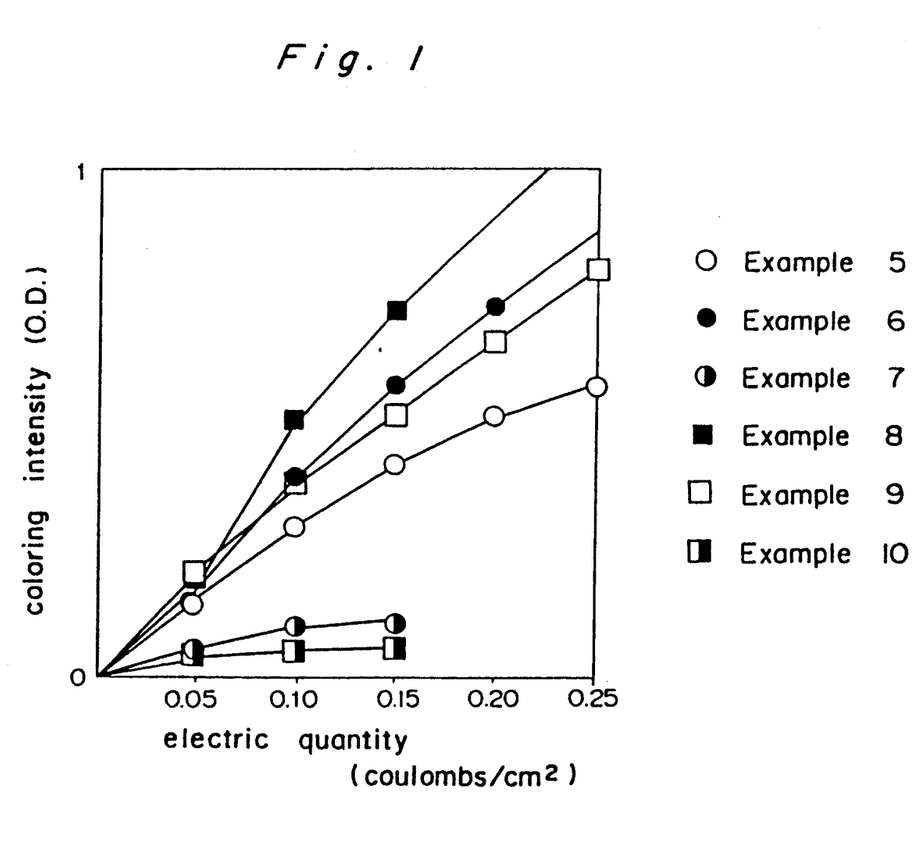
FIG. 1 shows a relation between an electric quantity of electrochemical reduction and their coloring intensity as embodied in Examples 5 to 10.
Figure 2:
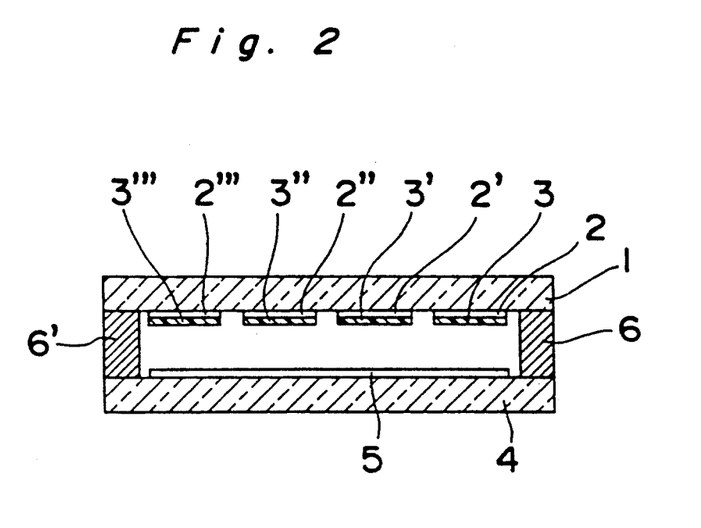
FIG. 2 is a sectional view of an embodiment of a conventional type electrochromic display device using a polyviologen coated electrode.
Figure 3:
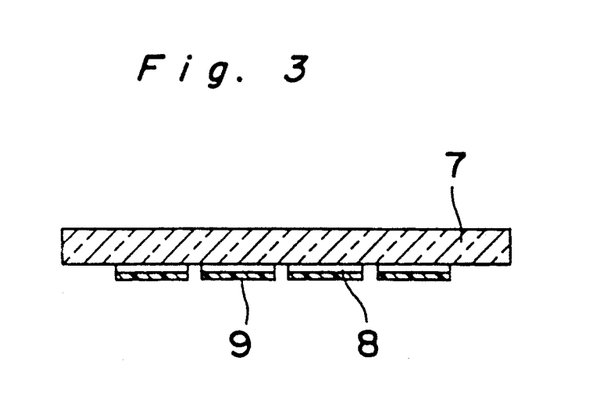
FIG. 3 is a sectional view of an embodiment of polyviologen coated electrode 7 denotes a display substrate made of a transparent material, 8 denotes a display electrode consisting of a transparent electroconductive film which is patterned in the shape of stripes and 9 denotes a polyviologen membrane.

The electrochemical property and spectroscopic property were measured with the polyviologen modified electrode thus obtained as working electrode and a Pt wire as a counter electrode in an water electrolyte containing 0.1 mol/l of potassium chloride as a support electrolyte to make a cell. The polyviologen modified electrode shows two oxidation-reduction potentials at −0.59 V and −0.9 V identified with viologen. As shown in FIG. 1 of the accompanying drawing, the optical density of the viologen modified electrode at $\lambda_{max}$ 550 nm was increased according to electric quantity of potentiostatic electropolymerization at −0.8 V (SCE).

EXAMPLES 6 to 10

In the same manner as in Example 5 but using 1,7-heptanebis(4-cyanopyridinium)dibromide obtained in Preparation Example 6 (144 mg) (Example 6), 1,10-decanebis(4-cyanopyridinium)dibromide obtained in Preparation Example 5 (161 mg) (Example 7), p-xylidyl-bis(4-cyanopyridinium)dibromide obtained in Prepation Example 1 (187 mg) (Example 8) and m-xylidylbis(4-cyanopyridinium)dibromide obtained in Prepation Example 2 (187 mg) (Example 9) and o-xylidylbis(4-cyanopyridinium)bibromide obtained in Prepation Example 3 (187 mg) (Example 10) as the monomers, viologen modified electrodes as shown in Table 2 were prepared. Viologen films were excellent in mechanical strength and hardly peeled off even by rubbing with a cloth.

With these electrodes, electrochemical and optical properties were measured in the same manner as in Example 5. The first redox potential and maximum absorption the maximum absorption are shown in Table 2, therein. Further, the optical density of polyviologen modified electrode at each absorption maximam was shown in FIG. 1 in comparison with electric quantity of potentiostatic electropolymerization at −0.8 V. 550 nm is shown in FIG. 1.

TABLE 2

| Example No. | Film thickness (μm) | First redox potential (V) | Maximum absorption (nm) |
| --- | --- | --- | --- |
| 6 | 0.7 | −0.650 | 552 |
| 7 | 0.2 | −0.641 | 543 |
| 8 | 0.7 | −0.573 | 550 |
| 9 | 0.6 | −0.594 | 548 |
| 10 | 0.2 | −0.665 | 540 |

EXAMPLE 11

Tetramethylenebis(4-cyanopyridinium)dibromide (301 mg) as obtained in Preparation Example 4 and sodium polystyrenesulfonate (600 mg) (Polymer Science K.K., $\overline{M}w=88,000$) as a supporting polyelectrolyte were dissolved in water (20 ml) and lutidine (0.5 ml) to make an electrolytic solution of pH 9.2. The monomer was electropolymerized potentiostatically at −0.8 V with 0.1 c/cm² of electrical quantity using an ITO glass electrode as a work electrode, a Pt wire as a counter electrode and a SCE as a reference electrode. During polymerization, the color at the work electrode surface could be seen as purple due to formation of polyviologen film thereon. When the electrode potential changed to 0 V, the color disappeared, and the work electrode was confirmed to be modified with an extremely uniform pale yellowish polyviologen film in a thickness of 1.1 μm. This film was excellent in mechanical strength and hardly peeled off even by rubbing with a cloth.

The electrochemical and spectroscopic properties were measured with the polyviologen modified work electrode thus obtained using a Pt wire as a counter electrode in an water electrolyte containing 0.1 mol/l potassium chloride as a support electrolyte. The polyviologen modified electrode shows two redox potentials at −0.59 V and −0.9 V identified with viologen. When applied at to −0.8 V, the electrode showed an optical density (O.D.) of 1.01 at $\lambda_{max}$ 550 nm.

EXAMPLE 12

Mesitylenyltris(4-cyanopyridinium)tribromide (71 mg) as obtained in Preparation Example 7 was dissolved in 0.1 mol/l phosphate buffer (pH, 8; a mixture of sodium phosphate and disodium phosphate) (20 ml) to make an electrolytic solution. The monomer was electropolymerized potentiostatically at −0.8 with 0.1 c/cm² of electrical quantity using an ITO glass electrode as a work electrode, a Pt wire as a counter electrode and a SCE as a reference electrode. During polymerization, the color at the work electrode surface could be seen as blue purple due to formation of polyviologen film thereon. When the electrode potential changed to 0 V, the color disappeared, and the work electrode was confirmed to be modified with a polyviologen film of a thickness of 0.6 μm.

The electrochemical property and spectroscopic property of the polyviologen modified work electrode thus obtained was measured using a Pt wire as a counter electrode in an water electrolyte containing 0.1 mol/l potassium chloride as a support electrolyte to make a cell. The cell shows two oxidation reduction potentials at −0.56 V and −0.88 V identified with viologen. When applied at −0.8 V, the electrode showed an optical density (O.D.) of 0.27.

EXAMPLE 13

P-xylidylbis(4-cyanopyridinium)dibromide (93.4 mg) as obtained in Preparation Example 1 and mesitylenyl-tris(4-cyanopyridinium)tribromide (7 mg) as obtained in Preparation Example 7 were dissolved in the same buffer solution as used in Example 12 to make an electrolytic solution, These monomer was electropolymerized potentiostatically at −0.8 V with 0.1 c/cm² electric quantity, using an ITO glass electrode as a work electrode, a Pt wire as a counter electrode and a SCE as a reference electrode. During polymerization, the color at the work electrode surface could be seen as blue purple due to formation of polyviologen film thereon. When the potential changed to 0 V, the color disappeared, and the work electrode was confirmed to be modified with a polyviologen film of a thickness of 0.6 μm.

The electrochemical and spectroscopic properties of the polyviologen modified work electrode thus obtained was measured using a Pt wire as a counter electrode in an water electrolyte containing 0.1 mol/l potassium chloride as a support electrolyte to make a cell. The cell shows two oxidation reduction potentials at −0.57 V and −0.88 V identified with viologen. When applied at −0.8 V, the electrode showed an optical density (O.D.) of 0.24.

EXAMPLE 14

The polyviologen electrodes obtained in Examples 1 to 13 were immersed in water, dimethylformamide, acetone, acetonitrile, methanol, ethanol, chloroform, propylene carbonate or tetrahydrofuran at 60° C. for 1 hour, but no peeling of the polyviolegen film was observed. Also, the electrodes were completely insoluble to these solvents.

EXAMPLE 15

In the cells as prepared in Examples 1 to 13, the cathodic potential was applied at −0.8 V. After retaining the colored state at the modified electrodes for 1 hour, the potential was raised to 0 V. Coloring disappeared immediately and completely, and no annealing was recognized on the modified electrodes.

EXAMPLE 16

An electrochemical property of a cell composed of the polyviologen modified work electrode as obtained in Example 5, was measured using a Pt wire as a counter electrode, SCE as a reference electrode and an dimethylformamide electrolyte containing 0.1 mol/l of tetrabutylammonium tetrafluoroborate. Oxidation-reduction potentials were observed at −0.43 V and −0.81 V (SCE) identified with the modified electrode as seen in dimethylformamide. When adopted at −0.6 V (SCE), the electrode assumed blue. After retaining the colored state for 1 hour, an potential of working electrode was raised to 0 V. Coloring disappeared immediately, and no annealing was recognized on the modified electrodes. Also, the electrodes was completely insoluble to the electrolyte solution and peeling of the polyviologen film occurred.

Test for Response Speed 640 mg of tetramethylene bis(4-cyanopyridinium) dibromide and 1.62 g of potassium polyvinylsulfonate (made by aNAKARAI TESK Co. Ltd.) is solved in 100 ml of water to give a liquid electrolyte adjusted to pH8.2. In the electrolyte, the monomer was electropolymerized potentiostatically at −0.8 V (SCE) with 0.1 c/cm² electrolytic quantity using 20×40 mm² of ITO electrode as an operating electrode and 20×20 mm² of platinum electrode as a counter electrode are set and thereby an insoluble viologen film are electrochemically formed on the operating electrode to prepare a polyviologen modified electrode. The resultant modified electrode and a new ITO electrode are oppositely positioned with a distance of 4 mm and a space there between is filled with a water electrolyte containing 0.1 mol/l potassium chloride to prepare an electrochemical test cell. When potential of 2 second pulse with −0.8 V to 0 V (v.s. SCE) is applied to the operating electrode in the cell, a change of absorption degree is observed. Coloring and discoloring are completed within about 1 second. The shorter distance between the electrodes, the larger area and the more applied voltage the cell has, the faster the response speed the cell has.

What is claimed:

1. A polyviologen modified electrode which comprises an insoluble film of polyviologen polymerized on a base electrode by electrochemical reduction with decyanation and electro-deposition of monomer represented by the formula (I)

Wherein $R^1$ is a divalent group selected from the groups consisting of alkylene, cycloalkylene, arylene and arylalkylene or a trivalent group selected from the groups consisting of alkanetriyl, cycloalkanetriyl, arylalkanetriyl and aryltriyl; $X^-$ is a counter anion; m is 2 or 3.

2. The polyviologen modified electrode according to claim 1 in which the insoluble film of polyviologen polymerized on the base electrode has a structure of main chain part represented by the formula (II):

wherein $R^1$ is a divalent group selected from the groups consisting of alkylene, cycloalkylene, arylene and arylalkylene or a trivalent group selected from the groups consisting of alkanetriyl, cycloalkanetriyl, arylalkanetriyl and aryltriyl; $Xa^-$ is a counter anion.

3. The polyviologen modified electrode according to claim 2, in which the insoluble film of polyviologen has a structure of main chain part represented by the formula (II) wherein $Xa^-$ is a polyanion and wherein the insoluble film of polyviologen is polymerized on the base electrode by electrochemical reduction and ion-bonding crosslinking electrodeposition of monomer represented by the formula (I).

4. The polyviologen modified electrode according to claim 1, in which the base electrode is selected from the group consisting of a metal electrode, a glass electrode coated with Indium Tin Oxide or Tin Oxide and a plastic electrode coated with Indium Tin Oxide or Tin Oxide.

5. A method for preparing a polyviologen modified electrode, in which cathodic potential is applied to an base electrode to electrochemically reduce a monomer represented by the formula (I) in a liquid electrolyte with a controlled pH of 7 to 10, thereby polymerization of the monomer and electrodeposition is made on the electrode to form a film of polyviologen attached to a surface of the electrode.

6. The method for preparing a polyviologen modified electrode according to claim 5, in which the electrolyte contains a polyanion electrolyte as a supporting electrolyte.

7. The method for preparing a polyviologen modified electrode according to claim 6, in which the polyanion electrolyte is a polysulfonate or a polycarboxylate.

8. An electrochemical cell which comprises at least one modified polyviologen electrode according to claim 1.

* * * * *